(12) United States Patent
Anderson et al.

(10) Patent No.: US 9,575,900 B2
(45) Date of Patent: *Feb. 21, 2017

(54) DIGITAL SIGNAL PROCESSING DATA TRANSFER

(71) Applicant: Imagination Technologies Limited, Kings Langley (GB)

(72) Inventors: Adrian J. Anderson, Chepstow (GB); Gary C. Wass, St. Albans (GB); Gareth J. Davies, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,719

(22) Filed: Feb. 19, 2015

(65) Prior Publication Data

US 2015/0161058 A1 Jun. 11, 2015

Related U.S. Application Data

(63) Continuation of application No. 13/646,649, filed on Oct. 5, 2012, now Pat. No. 8,990,522.

(30) Foreign Application Priority Data

Oct. 26, 2011 (GB) .................................. 1118534.5

(51) Int. Cl.
*G06F 9/30* (2006.01)
*G06F 12/10* (2016.01)
(Continued)

(52) U.S. Cl.
CPC .......... *G06F 12/1081* (2013.01); *G06F 9/3009* (2013.01); *G06F 9/3851* (2013.01);
(Continued)

(58) Field of Classification Search
CPC ........ G06F 13/28; G06F 9/3851; G06F 9/542; G06F 9/544
See application file for complete search history.

(56) References Cited

U.S. PATENT DOCUMENTS 5,499,350 A  3/1996  Uchida et al.
6,560,667 B1 * 5/2003  Wolrich .............. G06F 13/1642
                                                        710/240
(Continued)

FOREIGN PATENT DOCUMENTS

CN    1889063 A   1/2007
EP    1557764 A   7/2005
(Continued)

OTHER PUBLICATIONS

TMS320C6474 DSP Enhanced DMA (EDMA3) Controller, Jul. 1, 2011 (Jul. 1, 2011), XP055049608, Retrieved from the Internet: URL:http://www.ti.com/litJug/sprug11b/sprug11b.pdf, pp. 13, 21, 23, 46, table 2.6.
(Continued)

*Primary Examiner* — Jared Rutz
*Assistant Examiner* — Jean Edouard
(74) *Attorney, Agent, or Firm* — Vorys, Sater, Seymour and Pease LLP; Vincent M DeLuca

(57) ABSTRACT

A technique for transferring data in a digital signal processing system is described. In one example, the digital signal processing system comprises a number of fixed function accelerators, each connected to a memory access controller and each configured to read data from a memory device, perform one or more operations on the data, and write data to the memory device. To avoid hardwiring the fixed function accelerators together, and to provide a configurable digital signal processing system, a multi-threaded processor controls the transfer of data between the fixed function accelerators and the memory. Each processor thread is
(Continued)

allocated to a memory access channel, and the threads are configured to detect an occurrence of an event and, responsive to this, control the memory access controller to enable a selected fixed function accelerator to read data from or write data to the memory device via its memory access channel.

17 Claims, 7 Drawing Sheets

(51) Int. Cl.
- *G06F 9/38* (2006.01)
- *G06F 9/54* (2006.01)
- *G06F 13/28* (2006.01)
- *G06F 9/50* (2006.01)

(52) U.S. Cl.
CPC ............ *G06F 9/5016* (2013.01); *G06F 9/542* (2013.01); *G06F 9/544* (2013.01); *G06F 13/28* (2013.01); *G06F 2212/251* (2013.01)

(56) References Cited

U.S. PATENT DOCUMENTS

| | | | | |
|---|---|---|---|---|
| 6,694,385 B1* | 2/2004 | Fuoco | ............... | G06F 13/28 710/104 |
| 7,685,354 B1* | 3/2010 | Hetherington | ........ | G06F 12/084 711/163 |
| 8,554,968 B1* | 10/2013 | Onufryk | ................ | G06F 13/24 710/260 |
| 2002/0013861 A1* | 1/2002 | Adiletta | ............... | G06F 9/3851 719/313 |
| 2002/0040429 A1* | 4/2002 | Dowling | ............ | G06F 9/30032 712/228 |
| 2003/0145159 A1* | 7/2003 | Adiletta | ............. | G06F 13/1642 711/104 |
| 2003/0212852 A1* | 11/2003 | Wolrich | ............ | G06F 13/4234 711/101 |
| 2005/0172088 A1* | 8/2005 | Klingman | ............ | G06F 9/4843 711/154 |
| 2005/0216666 A1* | 9/2005 | Sih | ........... | G06F 12/08 711/118 |
| 2006/0277325 A1 | 12/2006 | Jin et al. | | |
| 2007/0038798 A1* | 2/2007 | Bouchard | .............. | G06F 12/06 711/3 |
| 2007/0130381 A1* | 6/2007 | Sasaki | .................... | G06F 13/32 710/15 |
| 2008/0046668 A1* | 2/2008 | Newburn | ............ | G06F 9/30003 711/154 |
| 2008/0114937 A1* | 5/2008 | Reid | ................... | G06F 11/3636 711/117 |
| 2008/0162849 A1* | 7/2008 | Savagaonkar | ........ | G06F 12/145 711/163 |
| 2009/0070785 A1* | 3/2009 | Alvez | .................... | G06F 9/541 719/318 |
| 2009/0172304 A1* | 7/2009 | Gueron | ............... | G06F 12/0802 711/154 |
| 2010/0153953 A1* | 6/2010 | Adl-Tabatabai | ........ | G06F 9/528 718/101 |
| 2010/0281222 A1* | 11/2010 | Liu | ..................... | G06F 12/0833 711/133 |
| 2011/0149651 A1* | 6/2011 | Gorobets | ............ | G11C 11/5628 365/185.03 |
| 2011/0276974 A1* | 11/2011 | Chung | ................ | G06F 13/1689 718/103 |
| 2012/0036509 A1* | 2/2012 | Srinivasan | .............. | G06F 9/526 718/102 |
| 2012/0079164 A1* | 3/2012 | Hakewill | .............. | G06F 12/109 711/6 |
| 2012/0110267 A1* | 5/2012 | Karkkainen | .......... | G06F 9/5061 711/126 |
| 2012/0117301 A1* | 5/2012 | Wingard | ............. | G06F 12/1027 711/6 |
| 2012/0210071 A1* | 8/2012 | Black | .................... | G06F 15/167 711/130 |
| 2012/0221785 A1* | 8/2012 | Chung | .................... | G11C 5/02 711/105 |
| 2013/0067138 A1* | 3/2013 | Schuette | ............... | G06F 3/0616 711/103 |
| 2013/0097409 A1* | 4/2013 | Yamana | .................... | G06F 9/30 712/219 |

FOREIGN PATENT DOCUMENTS

| | | |
|---|---|---|
| EP | 1645968 A1 | 4/2006 |
| GB | 2446701 A | 5/2008 |
| WO | 2007123542 A1 | 11/2007 |
| WO | 2008004158 A1 | 1/2008 |

OTHER PUBLICATIONS

Bell et al., "Multicore Programming Guide", Aug. 1, 2009 (Aug. 1, 2009), XP055049589, Retrieved from the Internet: URL:http://www.polyscope.ch/d1Center/ps/2010 15/1510.05.pdf.

Mathes, "How to Approach Inter-Core Communication on TMS320C6474", Jan. 1, 2009 (Jan. 1, 2009), XP055049737, Retrieved from the Internet: URL:http:/lwww.ti.com/an/sprab25/sprab25.pdf.

Nikolic-Popovic, "Using TMS320C6416 Coprocessors: Viterbi Coprocessor (VCP)", Texas Instruments Application Report, Dallas, TX, USA, Sep. 1, 2003 (Sep. 1, 2003), pp. 1-24, XP002591629, Retrieved from the Internet: URL:http://focus.ti_com_cn/cn/lit/antspra750d/ spra750d.pdf pp. 11-13.

* cited by examiner

DIGITAL SIGNAL PROCESSING DATA TRANSFER

BACKGROUND

Digital signal processing is used in a wide variety of applications. Many of these applications are real-time in the sense that the time constraints exist on the processing of the data in order for it to be meaningful or useful to an end user. An example of this is digital broadcast streams, such as digital television and digital radio. The digital signal processing system needs to be capable of processing and decoding the real-time streams rapidly enough to enable the data to be output as quickly as it is received (barring buffering).

Digital signal processing systems often utilise one or more dedicated hardware peripherals in addition to more general purpose digital signal processors. The hardware peripherals are processing blocks that are designed to perform a specific signal processing task (e.g. a particular type of error correction) in a rapid and efficient manner. A digital signal processing system can directly connect (i.e. hardwire) the hardware peripherals together in a defined sequence in order to meet the needs of a particular type of real-time data.

However, the requirements of different types of real-time data can vary significantly. For example, the various different digital television and radio standards used around the world often have the real-time data structured differently, e.g. using different types or parameters for coding, interleaving, equalisation etc. Therefore, if dedicated inter-connected hardware peripherals are used, then a different digital signal processing system needs to be constructed for each type of real-time data.

The embodiments described below are not limited to implementations which solve any or all of the disadvantages of known digital signal processing systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technique for transferring data in a digital signal processing system is described. In one example, the digital signal processing system comprises a number of fixed function accelerators, each connected to a memory access controller and each configured to read data from a memory device, perform one or more operations on the data, and write data to the memory device. To avoid hardwiring the fixed function accelerators together, and to provide a configurable digital signal processing system, a multi-threaded processor controls the transfer of data between the fixed function accelerators and the memory. Each processor thread is allocated to a memory access channel, and the threads are configured to detect an occurrence of an event and, responsive to this, control the memory access controller to enable a selected fixed function accelerator to read data from or write data to the memory device via its memory access channel.

According to one aspect, there is provided a digital signal processing system, comprising: a memory device; a memory access controller providing a plurality of channels for accessing the memory device; a plurality of fixed function accelerators, each connected to the memory access controller and each configured to read data from the memory device via one of the channels, perform one or more operations on the data, and write data to the memory device via one of the channels; and a processor coupled to the memory access controller and configured to execute a plurality of threads, each thread arranged to control one of the channels, wherein at least one of the threads is configured to detect an occurrence of an event and, responsive thereto, control provision of data from the memory device to a selected fixed function accelerator using the thread's associated channel.

According to another aspect, there is provided a method of transferring data in a digital signal processing system, comprising: executing a plurality of threads on a processor, wherein each thread independently performs a sequence of operations comprising: waiting until a predefined event is detected; and responsive to the predefined event, controlling a memory access controller to enable a fixed function accelerator to read data from or write data to a memory device via a memory access channel associated with that thread.

The methods described herein may be performed by a computer configured with software in machine readable form stored on a tangible storage medium e.g. in the form of a computer program comprising computer program code for configuring a computer to perform the constituent portions of the described methods. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The above features may be combined as appropriate, as would be apparent to a skilled person, and may be combined with any of the aspects of the examples.

BRIEF DESCRIPTION OF THE DRAWINGS

Embodiments will be described, by way of example, with reference to the following drawings, in which.

DETAILED DESCRIPTION

Embodiments are described below by way of example only. These examples represent the best ways of putting the embodiments into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described below is a configurable digital signal processing system that makes use of both general purpose digital signal processors as well as specialised hardware peripherals, which avoids hardwiring these elements into a particular structure and hence avoids limiting the configurability of the system. This is achieved by using a fast data transfer system to enable a hardware peripheral to be configured and used to process data in a rapid and efficient manner. This utilises a combination of a multi-threaded processor to control memory transfers to and from the hardware peripherals, and an efficient signalling system to enable the system elements to communicate the occurrence of events. This enables the digital signal processing system to be sufficiently configurable to be adapted to different standards, whilst maintaining the computational performance needed to handle real-time data.

Figure 1:
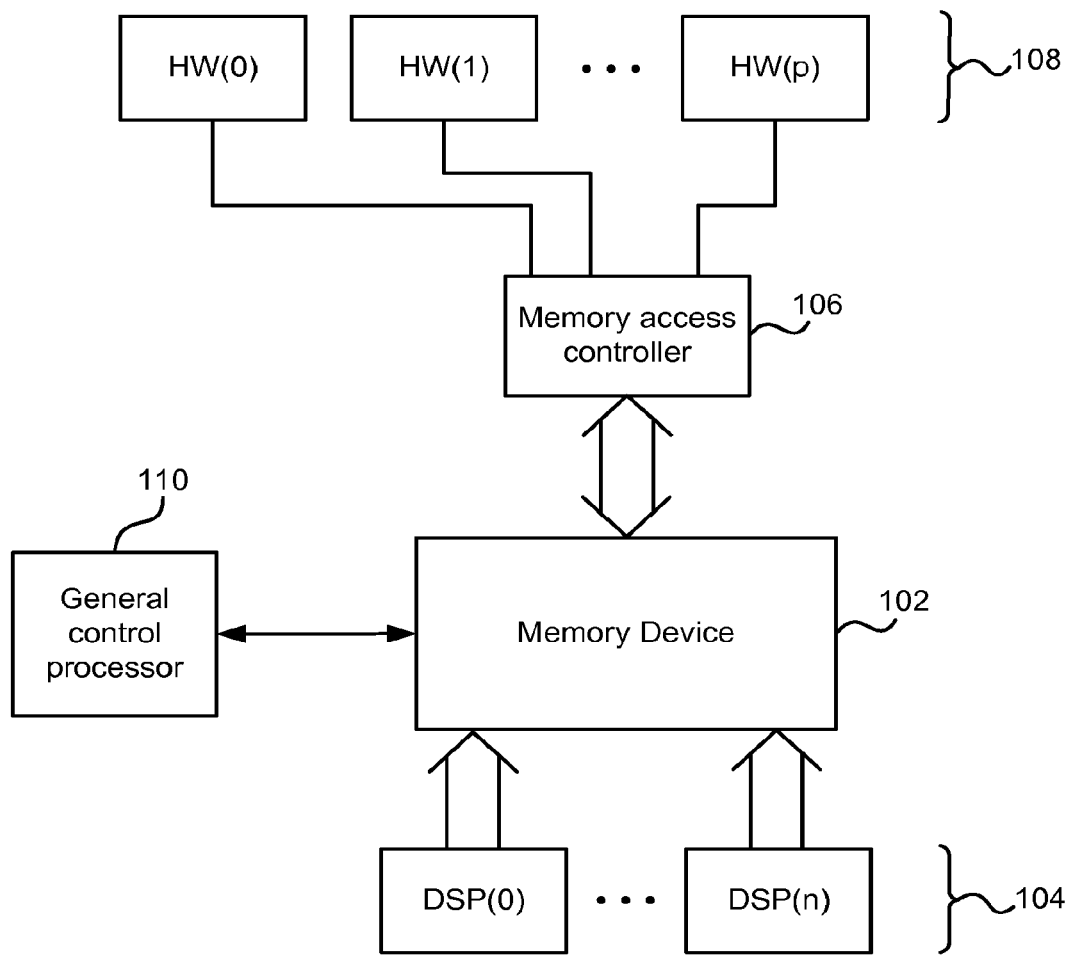
FIG. 1 illustrates a configurable digital signal processing system.

Reference is first made to FIG. 1, which shows the structure of an example configurable digital signal processing system. The system comprises a memory device 102, which is used for the storage of data. In the example of FIG. 1, the memory device 102 can be used to store both data being processed and configuration data for operating the digital signal processing system. In other examples, these two types of data can be split between different memory devices. The memory device 102 can be any suitable form of random access memory (RAM).

Connected to the memory device 102 is one or more digital signal processors (DSPs) 104. The DSPs 104 are processors that are programmable to perform signal processing calculations on data, such as, for example, fast fourier transforms and equalisation. Whilst not considered general-purpose processors, the DSPs 104 are more configurable than the hardware peripherals described below. The DSPs 104 execute program code/instructions to read data from the memory device 102, perform signal processing operations on the data, and write data back to the memory device 102.

Also connected to the memory device 102 is a memory access controller 106, which provides access to the memory device 102 for a plurality of hardware peripherals 108. In some examples, the memory access controller 106 can be in the form of a direct memory access (DMA) controller. The memory access controller 106 provides a plurality of memory access channels (e.g. DMA channels) that can be used by the hardware peripherals 108 to enable the reading or writing of data from or to the memory device 102. Note that in addition to transferring data between a hardware peripheral and the memory device, the memory access controller can also be configured in some examples to transfer data directly from one hardware peripheral to another hardware peripheral.

As noted above, the hardware peripherals 108 are specialised, dedicated hardware blocks that are configured to perform a particular signal processing task. For example, one hardware peripheral may be a specialised Viterbi decoding block, and another one may be a specialised deinterleaving block. The hardware peripherals may also be known as fixed function accelerators. Each of the hardware peripherals operates independently of each other. The hardware peripherals may be sufficiently configurable to be provided with operational parameters specific to their task, but they are not sufficiently configurable to change their task (e.g. a Viterbi block cannot be reconfigured as a deinterleaving block). Therefore, the hardware peripherals are more specialised to a particular task than the DSPs 104. However, the hardware peripherals are arranged to perform their specialised tasks in a very rapid and efficient manner.

Also connected to the memory device 102 is a general control processor 110, which can be used to initialise, configure and control the operation of the digital signal processing system, as described in more detail below.

The digital signal processing system described above provides flexibility in the signal processing operations. For example, the system can be arranged to operate such that the different DSPs 104 and hardware peripherals 108 process the data in any desired configuration or sequence. Each hardware peripheral or DSP can operate on one or more blocks of data (also referred to herein as a buffer of data) provided by other parts of the system and stored in the memory device, and generates and stores one or more buffers of data to be used by other elements of the system. This enables the digital signal processing system to be used for a variety of different types of signal, e.g. for different broadcast/telecommunication standards.

Figure 2:
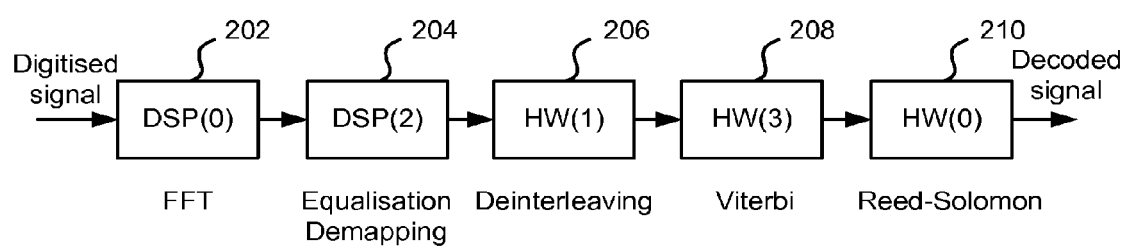
FIG. 2 illustrates a sequence of operations performed by the configurable digital signal processing system for an example real-time signal.

FIG. 2 illustrates how the system of FIG. 1 can be configured to process a particular type of signal. In the example of FIG. 2, the system is being used to process an incoming digital TV signal, purely for illustrative purposes. A digitised baseband signal is received at the digital signal processing system, and the system is configured to initially process this data using a first DSP, denoted DSP(0) 202 to perform a fast fourier transform (FFT). Following this, a second DSP, denoted DSP(2) 204 performs equalization and demapping on the data output from DSP(0) 202. A hardware peripheral HW(1) 206 then performs deinterleaving on the data, and this is then passed to another hardware peripheral HW(3) 208 which performs Viterbi decoding. A further hardware peripheral HW(0) 210 takes the data from the Viterbi decoding and performs Reed-Solomon decoding. The decoded data may then be further processed by additional DSPs, hardware peripherals or other processors as needed but not shown in FIG. 2.

The example of FIG. 2 illustrates how the different blocks of the system of FIG. 1 can be combined together to form an overall signal processing system that is suitable for a particular type of signal. Because the blocks of FIG. 2 are not hardwired together, but rather exchange data using the memory device 102 of FIG. 1, the same signal processing system can be configured to operate in different ways for different types of signal.

For the system of FIG. 1 to operate in a sequence of the type shown in FIG. 2, once a hardware peripheral or DSP has finished processing, the next hardware peripheral that is to operate on the newly generated data is configured and activated to perform their processing operation. Any delay in the configuration and activation of these hardware peripherals degrades the system throughput, which is detrimental in the case of real-time signals. These delays should therefore be minimised, and this is achieved through the use of a control signalling structure as illustrated below with reference to FIG. 3.

Figure 3:
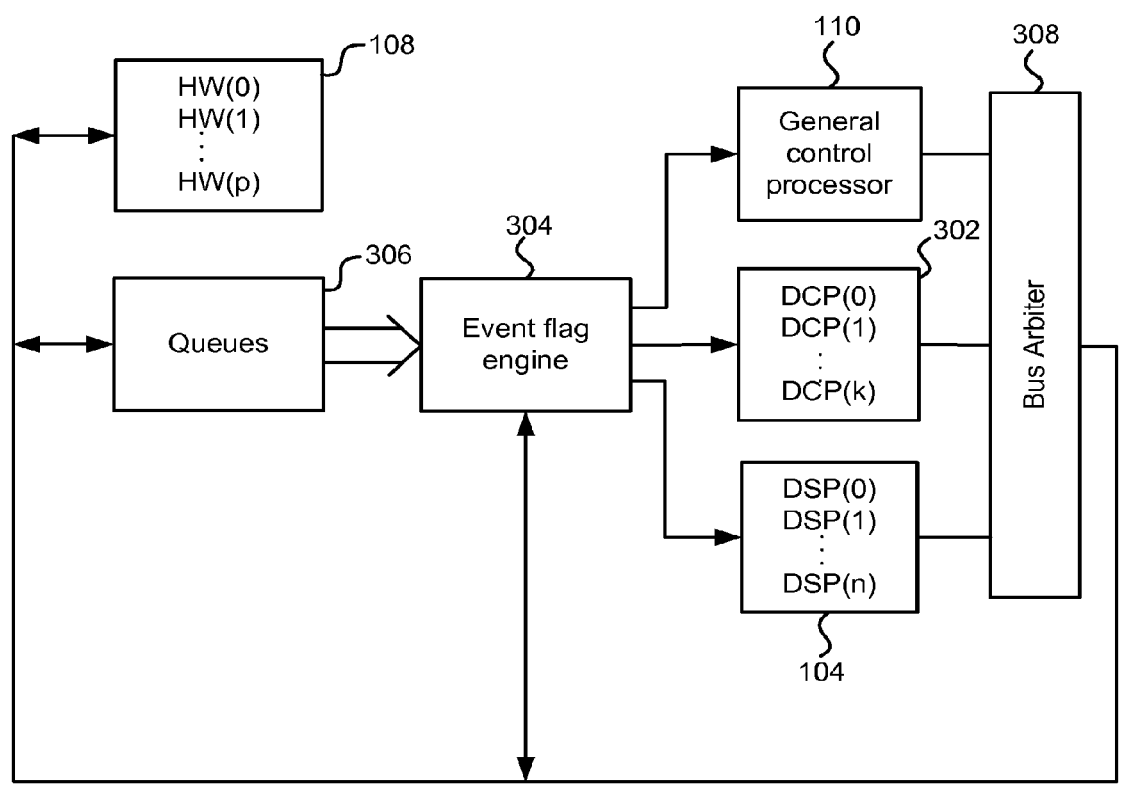
FIG. 3 illustrates a control signalling structure for the configurable digital signal processing system.

FIG. 3 shows a control signalling structure for the configurable digital signal processing system that enables the different elements of the system to pass messages and signalling in a rapid and efficient manner. This structure also enables the elements to react quickly to events, so that the hardware peripherals can be configured and activated when needed without significant delay.

The configuration and activation of the hardware peripherals 108 is controlled by a multi-threaded processor 302, which can in some examples be referred to as a DMA control processor (DCP). The multi-threaded processor is arranged to execute a plurality of threads. Each thread executes a sequence of instructions or operations independently, although they may share processor resources and are all part of a wider process running on the processor 302.

The multi-threaded processor 302 is coupled to the memory access controller 106 of FIG. 1, and can control the operation of the memory access controller 106. In some examples, the multi-threaded processor 302 is a separate hardware element in communication with the memory access controller 106, whereas in alternative examples the multi-threaded processor 302 is integral with the memory access controller 106.

In the following, the threads of the multi-threaded processor 302 are denoted DCP(0), DCP(1), . . . , DCP(k). Each thread is arranged to directly control one of the memory access channels (DMA channels) provided by the memory access controller 106. In other words, each thread is able to control the transfer of data to or from one or more of the hardware peripherals 108 and the memory device 102 via its associated memory access channel.

The multi-threaded processor 302 is connected to an event flag engine 304, which is described in more detail below. The event flag engine 304 is arranged to notify the multi-threaded processor 302 when specified events occur within the digital signal processing system. The threads can read the information from the event flag engine 304 and react to them accordingly. For example, a thread can execute a "wait" instruction that causes the execution of that thread's operations to pause until an event (notified by the event flag engine) occurs. When the event does occur, this causes the thread to activate and execute the thread's instructions/operations following the wait instruction.

This can be used to rapidly transfer data to and from the hardware peripherals. A particular thread can be arranged to wait for an event (such as a previous system element finishing processing), and, responsive to the event occurring, control the memory access controller to transfer configuration data and the data to be processed to a hardware peripheral using its associated memory access channel. Another thread can then be arranged to wait for the data to be processed by the hardware peripheral, and then control the memory access controller to transfer the processed data back to the memory device using its associated memory access channel. An example of this will be described in more detail with reference to FIGS. 5 to 7 below.

A contention management technique can be implemented by allocating a priority to each thread. For example, as noted above, each thread is allocated a sequential identifier from 0 to k. In the case where the execution of more than one thread at the same time clashes such that they cannot all perform their operations, then priority is given to the thread with, for example, the lowest identifier. Clearly, in alternative examples, a different priority system can be applied, such as the highest identifier. The system can then be configured such that the most important or system-critical hardware peripherals are handled by the highest priority threads to ensure that they will be served in the case of contention.

By having each of the memory access channels managed by an independently executing thread, the response time is significantly faster than if a normal, single-threaded processor was managing all the transfers of data to/from the hardware peripherals. Furthermore, the threads can be arranged to have the wait instruction placed at a point in its control software that reduces the delay before the next system element is activated. For example, as many operations as possible can be placed before the wait instruction, to allow these to be performed by the thread in advance of waiting for the event, thereby reducing the number of operations that need to be performed after the event occurs. In other words, pre-calculations can be performed by the threads where possible.

In addition to the multi-threaded processor 302, the DSPs 104 and the general control processor 110 also receive inputs from the event flag engine 304, enabling these elements to react to events as well. This is outlined in more detail below.

To enable the elements of the digital signal processing system to react to events, an efficient signalling system is used to allow communication between the different elements of the system. The signalling system is based on a set of queues 306 that carry signals between parts of the system. In examples, the queues 306 can comprise a plurality of FIFO queues.

Each queue can hold a plurality of data items which relate to information to be passed from one element of the system to another. For example, the information in the queue can indicate that data is ready to be processed by a particular hardware peripheral or DSP. The data items can be in the form of, for example, an instruction address or other identifier, a branch label, a memory address, or any other type of information that a system element wishes to pass to another element.

The data items can be written to the queues by the multi-threaded processor 302, the DSPs 104, or the general control processor 110. In addition, the data item at the head of any of the queues can be read by the multi-threaded processor 302, the DSPs 104, or the general control processor 110, and the data item at the head of any of the queues can be removed by any of these system elements. The multi-threaded processor 302, the DSPs 104, and the general control processor 110 read, write and/or modify the queues 306 using a data bus. Access to the bus is managed by a bus arbiter 308, which handles bus contention.

Each queue has associated notification logic (not shown in FIG. 3). The notification logic is arranged to assert a flag (or any other suitable binary indicator) to indicate when its associated queue contains at least one item. In other words, the flag indicates whether its associated queue is empty or not.

The flags from the notification logic of the queues are provided to the event flag engine 304. The event flag engine 304 can also receive input in the form of further flags indicating, for example, the state of a hardware peripheral or a port. In general, the event flag engine 304 acts as a matrix or mesh, tying up the queues to the processing elements that act upon the information in the queues. In some examples, the connectivity of the event flag engine 304 between the queues and the threads and DSPs can be configured by the general control processor 110.

Figure 4:
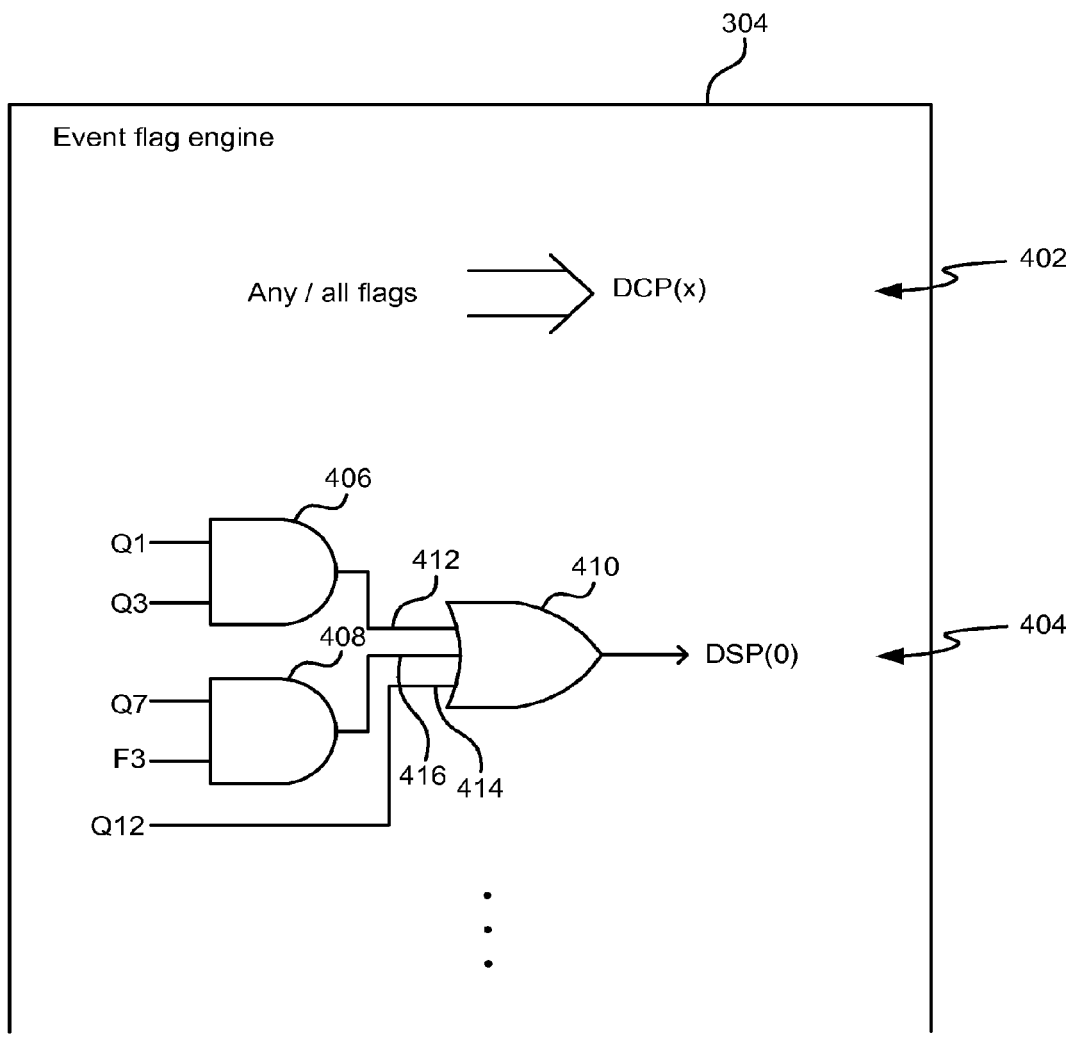
FIG. 4 illustrates an example event flag engine structure.

An example of the type of configurable logic that can be applied to the event flag engine 304 can be seen in FIG. 4. In some examples, any DCP thread can inspect the state of any flag provided to the event flag engine, as indicated at 402. This enables any thread to be configured to wait for any flag to be asserted (indicating the presence of an item in a particular queue). In addition or alternatively, layers of Boolean logic can be applied to the flags to enable the various flags to be combined, such that an event is notified to a system element only in a defined set of circumstances.

For example, FIG. 4 illustrates a combination of logic gates 404 that are used to provide an event notification to DSP(0). In other examples, similar combinations of gates can be used to provide event notification to any other processing element, such as the DCP threads on the multi-threaded processor 302, the general control processor 110 or other DSPs 104. In the example of FIG. 4, the gates 404 are constructed from a layer of AND gates followed by a layer of OR gates, with configurable connections in between.

In this example, a first AND gate 406 receives input from a flag associated with a queue denoted Q1 and a flag associated with a queue denoted Q3. Therefore, if both of these flags are asserted, indicating that both these queues have items in them, then the output of the AND gate 406 is true. Similarly, a second AND gate 408 receives input from a flag associated with a queue denoted Q7 and another flag not associated with a queue, for example indicating the state of a hardware peripheral and denoted F3. Again, if both of these flags are asserted, then the output of the AND gate 408 is true.

The outputs from the two AND gates 406, 408 are provided to an OR gate 410. The OR gate 410 also receives a third input from another queue flag denoted Q12 directly, without passing through an AND gate. Therefore, the output of the OR gate 410 is asserted whenever one or more of the three inputs are asserted. This output from the OR gate is provided to DSP(0) (in this example) and used to indicate an event and trigger an action.

In some examples, the system element receiving the output from the OR gate may want to know which input or inputs to the OR gate caused the output to be asserted. This is because the element may perform different operations in dependence on what caused the OR gate output to be asserted. To enable this, additional logic (not shown in FIG. 4) can be included to indicate this to the processing element. For example, this can be in the form of a multiplexer.

Furthermore, because more than one input to the OR gate can be asserted at the same time, a priority system can be applied to OR gate inputs to decide which event the system element will react to. For example, in FIG. 4, the OR gate 410 has three inputs, and of these, the top input 412 (as shown) is allocated the highest priority, the bottom input 414 the lowest priority, and the middle input 416 has an intermediate priority. Therefore, when the OR gate output is asserted, the processing element can use the additional logic to determine which OR gate inputs are asserted and react to the highest priority one. Because the connections between the flags, AND gates, and OR gate inputs are configurable, these can be configured such that the most important flags are connected to the highest priority input of the OR gate.

The event flag engine structure described above enables a flexible way for the differing processing elements to be notified of events occurring in the system (such as information waiting in the queues). The use of logic gates is very fast, ensuring low delay in the notification, and the prioritisation of OR gate inputs enable the processing elements to react to the most urgent events. As noted above, different combinations of gates and flags from those illustrated can be configured for any of the system elements, depending on the system requirements.

Figure 5:
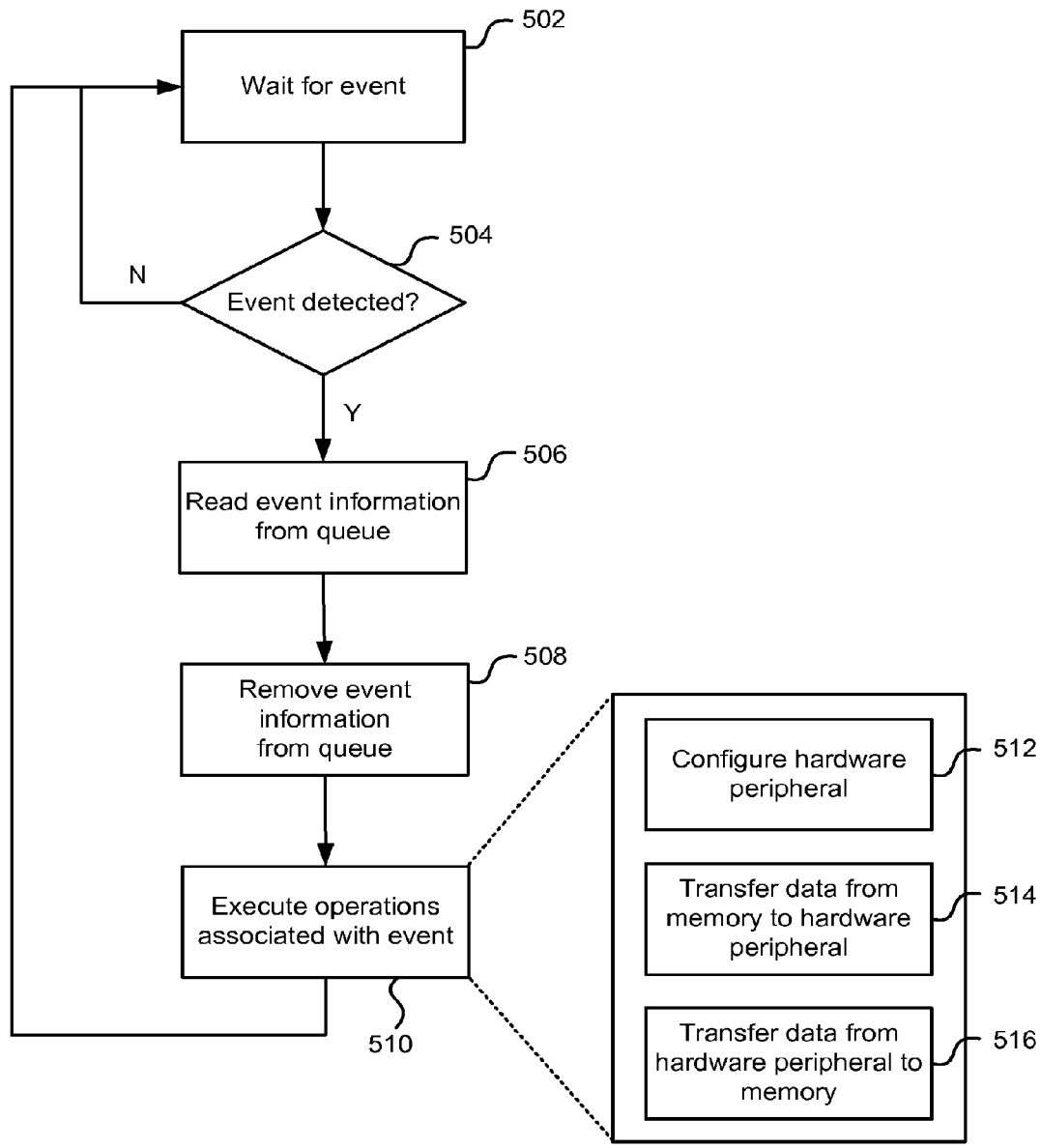
FIG. 5 illustrates a flow diagram of a method performed by a thread to act on an event in the control signalling structure.
Figure 6:
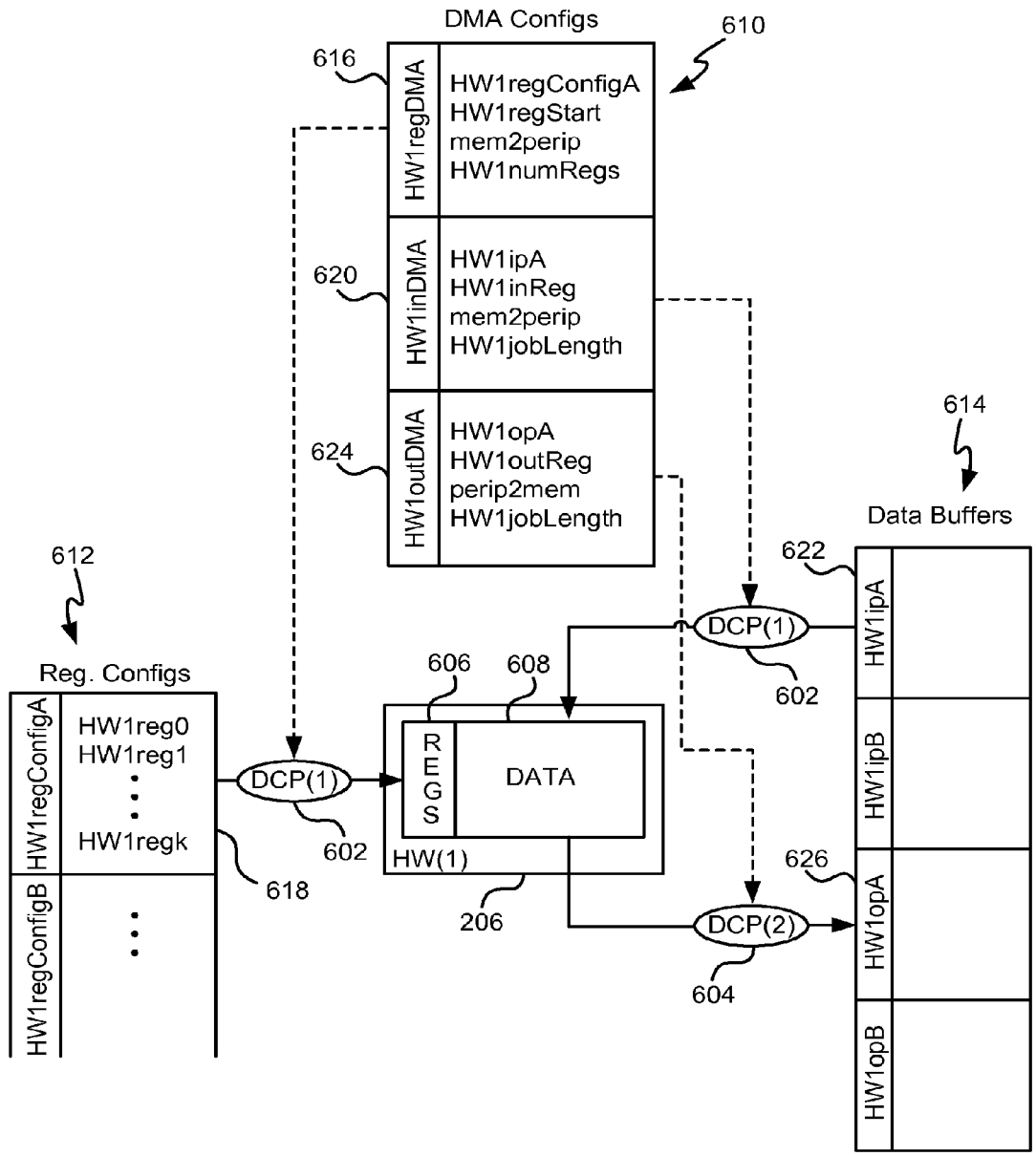
FIG. 6 illustrates an example thread-based configuration and transfer of data for a hardware peripheral.
Figure 7:
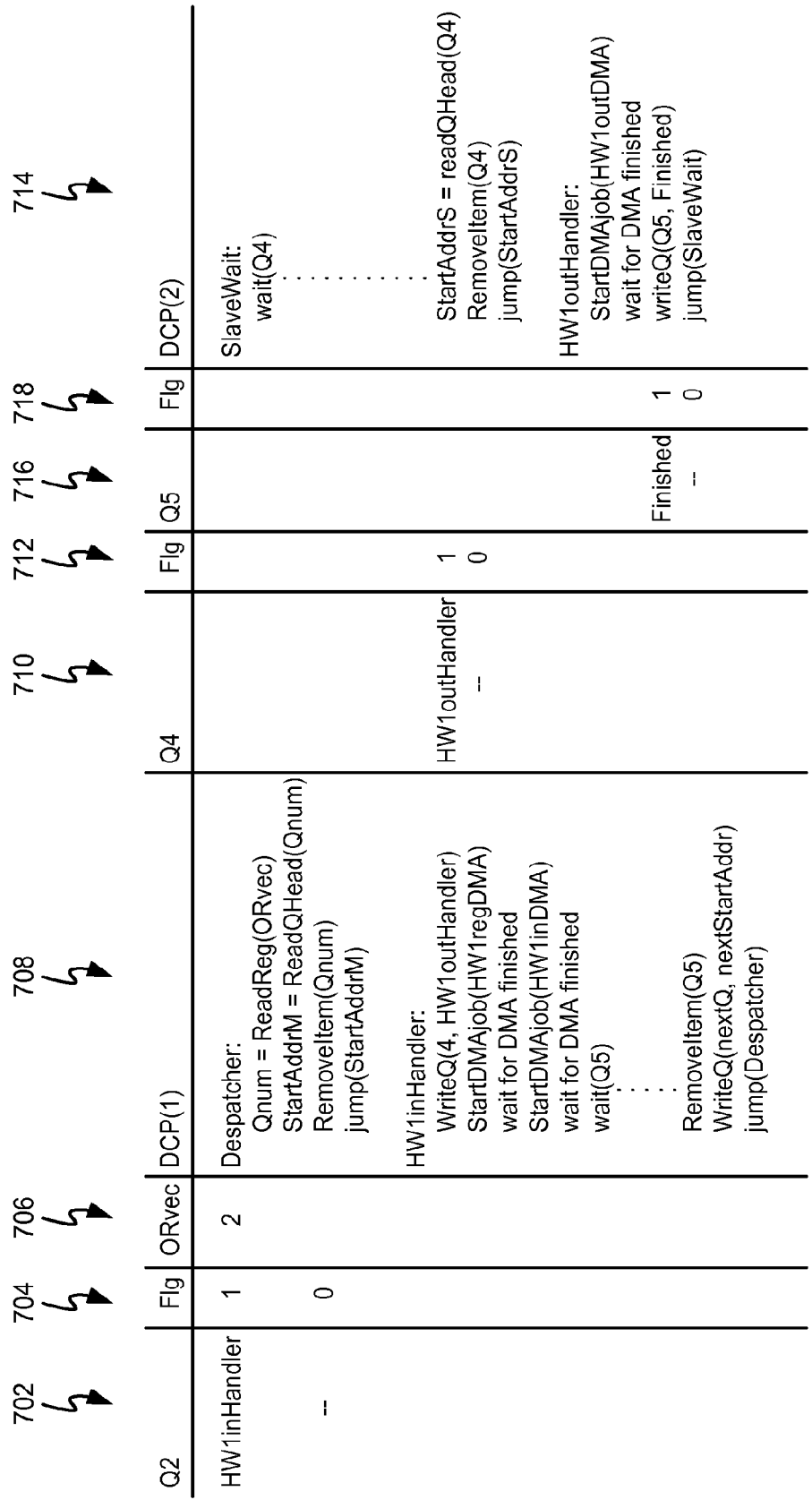
FIG. 7 illustrates an example set of queues, flags and instructions for controlling the hardware peripheral of FIG. 6.

Reference is now made to FIGS. 5 to 7, which illustrate an example process for how the threads and signalling structure operate together to configure and utilise a hardware peripheral to perform some processing on a buffer of data. Firstly, FIG. 5 shows a high-level flowchart of the operations performed by a thread executed on the multi-threaded processor 302. In step 502, the thread waits for a predefined event to occur. As noted above, this is defined by the event flag engine 304, which asserts an output to the multi-threaded processor 302 under defined conditions. This can either be in the form of waiting for a particular flag relating to a queue to be asserted, or waiting for a combination of flags defined by the logic gates.

It is determined in step 504 whether the event has been detected. If not, then the thread continues waiting. If the event is detected, then the thread reads, in step 506, the data item from the head of the queue (or queues) associated with the flag (or flags) giving rise to the notification of the event. The read data item is then removed from the queue (or queues) in step 508. The data item read from the queue is then used by the thread to execute instructions associated with the event in step 510. For example, the data item determines what sort of operation the thread performs. This can include, for example, configuring a hardware peripheral (step 512), transferring data from the memory device to a hardware peripheral for processing (step 514), and transferring processed data from the hardware peripheral to the memory device (step 516). As noted above, the thread uses its associated memory access channel to transfer data between the memory device and a hardware peripheral.

Reference is now made to FIG. 6, which illustrates an example of the type of data that is transferred by the threads when performing an operation such as that illustrated in FIG. 5. In this purely illustrative example, hardware peripheral HW(1) 206 is being configured and used to process a buffer of data from the memory device 102, and the processed data is written back to the memory device 102. Example thread denoted DCP(1) 602 is used to control the transfer of data into HW(1) 206, and example thread denoted DCP(2) 604 is used to control the transfer of data out of HW(1) 206. In this example, thread DCP(1) 602 is acting as the "master", in that it is initiating and controlling the operation, and thread DCP(2) 604 is acting as the "slave" in that it is controlled by DCP(1) 602. This can be achieved by DCP(1) 602 signalling to DCP(2) 604 through one or more of the queues 306, causing DCP(2) to execute the required instructions, as illustrated in more detail in FIG. 7 below. The hardware peripheral HW(1) 206 comprises configuration registers 606 that are loaded with data to configure the hardware peripheral, and data storage 608 for holding data being processed. Note that the hardware peripheral data storage 608 may, in some examples, be an internal buffer, but it can also be in the form of pipeline buffers that hold the incoming and outgoing data being processed. The use of the pipeline buffers avoids the need for the hardware peripheral to hold all the data to be processed, and it also means that input and output DMA operations can be run concurrently.

Three blocks of data are stored on the memory device 102 and used in this operation. The first block of data is DMA configuration data 610. The DMA configuration data 610 comprises data that is loaded into the memory access controller 106 by a thread in order to configure and initiate a transfer of data to or from a hardware peripheral. This is outlined in more detail below. The second block of data is hardware peripheral register configuration data 612. This block of data comprises data for configuring the hardware peripheral to perform a particular task, and it is loaded into the hardware peripheral configuration registers 606 by the memory access controller 106 responsive to particular DMA configuration data 610. The third block of data is the data buffers 614 that comprise the data that is to be, or has been, processed by the hardware peripheral. This is loaded into or read from the hardware peripheral data storage 608 by the memory access controller 106 responsive to particular DMA configuration data 610.

An example operation using the structure of FIG. 6 then operates as follows. Thread DCP(1) 602 reacts to an event and causes a block of DMA configuration data 610 denoted HW1regDMA 616 to be loaded from the memory device 102 into the memory access controller 106. The HW1regDMA 616 configuration data comprises four items of data: (i) a memory address in the memory device 102 holding hardware peripheral register configuration data, denoted HW1regConfigA 618 in this example; (ii) a register address in the hardware peripheral indicating where the hardware peripheral register configuration data should be loaded, denoted HW1regStart in this example; (iii) a mode indicator to indicate the direction of the transfer, i.e. memory device to hardware peripheral or vice versa, denoted mem2perip in this example; and (iv) a length value indicating the length of the data being transferred, denoted HW1numRegs in this example.

Loading HW1regDMA 616 into the memory access controller 106 causes the memory access controller 106 to begin transferring the data from the specified memory address HW1regConfigA 618 (which is part of the hardware peripheral register configuration data 612) into the registers 606 of the hardware peripheral using the memory access channel associated with thread DCP(1) 602. HW1regConfigA 618 comprises a plurality of data items that configure the registers of the hardware peripheral to perform the desired task.

Once the hardware peripheral HW(1) is configured in this way, the thread DCP(1) causes a second block of DMA configuration data 610 denoted HW1inDMA 620 to be loaded from the memory device 102 into the memory access controller 106. The HW1inDMA 620 configuration data again comprises four items of data: (i) a memory address in the memory device 102 holding a buffer of data, denoted HW1ipA 622 in this example; (ii) a register address in the hardware peripheral indicating where the buffer of data should be loaded, denoted HW1inReg in this example; (iii) a mode indicator to indicate the direction of the transfer, i.e. memory device to hardware peripheral or vice versa, denoted mem2perip in this example; and (iv) a length value indicating the length of the data being transferred, denoted HW1jobLength in this example.

Loading HW1inDMA 620 into the memory access controller 106 causes the memory access controller to begin transferring the data from the specified memory address HW1ipA 622 (which is part of the data buffers 614) into the hardware peripheral data storage 608 using the memory access channel associated with thread DCP(1) 602. Note that thread DCP(1) 602 is used for both the configuration data and data buffer transferred into the hardware peripheral. HW1ipA 622 comprises the data that is to be operated on by the hardware peripheral in accordance with its configuration.

The above operations covered the input of data into the hardware peripheral 206 using DCP(1) 602. DCP(2) 604 controls the transfer of data out of the hardware peripheral as described below. In some examples, the initiation and establishment of the memory access channel for transferring data out from the hardware peripheral can be performed before data is input to the hardware peripheral, so that it is ready and in place as soon as the data is processed. The thread DCP(1) 602 (the master) causes DCP(2) 604 (the slave) to control the transfer of a third block of DMA configuration data 610 denoted HW1outDMA 624 to be loaded from the memory device 102 into the memory access controller 106. The HW1outDMA 624 configuration data again comprises four items of data: (i) a memory address in the memory device 102 of a buffer of data, denoted HW1opA 626 in this example; (ii) a memory address in the hardware peripheral indicating where the buffer of data is located, denoted HW1outReg in this example; (iii) a mode indicator to indicate the direction of the transfer, i.e. hardware peripheral to memory, denoted perip2mem in this example; and (iv) a length value indicating the length of the data being transferred, denoted HW1jobLength in this example.

Loading HW1outDMA 624 into the memory access controller 106 causes the memory access controller to begin transferring the data from the specified hardware peripheral memory address HW1outReg 622 (which is part of the data storage 608) into the data buffers 614 of the memory device 102 using the memory access channel associated with thread DCP(2) 604. Note that thread DCP(2) 604 (not DCP(1)) is used for transfers out of the hardware peripheral. HW1opA 626 then comprises the data that has been processed by the hardware peripheral in accordance with its configuration.

Therefore, FIG. 6 illustrates how the movement of data to and from the hardware peripherals can be managed by the threads associated with the memory access channels. Because the configuration of a hardware peripheral is achieved by a direct memory transfer of a predefined block of configuration data, this can be performed very rapidly, minimising configuration delay. Note that whilst the description above for FIG. 6 outlined a particular sequence for the operations performed, in some examples this sequence can be different, for example some aspects of the sequence can be pipelined for faster operation.

Reference is now made to FIG. 7, which illustrates a set of example queue states and instructions that can be executed by the threads to implement the same process as shown in FIG. 6. In this example, column 702 shows the contents of a queue denoted Q2 (merely for illustrative purposes). The process in this example starts when an item "HW1inHandler" is placed on Q2. This can be caused, for example, by another element of the system completing a task and generating data ready for further processing by HW(1). The placing of HW1inHandler on Q2 causes the flag associated with Q2 to be asserted, as shown in column 704. This flag is provided to the event flag engine 304, which is configured to notify thread DCP(1) of an event. The event flag engine 304 sets the value of a register denoted ORvec to indicate which queue gave rise to the flag causing the event (e.g. from the OR gate inputs as described above). The state of ORvec is shown in column 706, and this shows that the queue identity giving rise to the event is 2.

Column 708 shows example pseudocode executed by thread DCP(1). DCP(1) is configured to execute a routine with the label "Despatcher" when this event is notified from the event flag engine 304. The Despatcher code reads the ORvec value (i.e. 2) and stores this as variable Qnum. It then reads the item at the head of the queue with identity Qnum (i.e. Q2) and stores this as variable StartAddrM (this has the value HW1inHandler). The item at the head of Q2 is then removed, as shown by the clearing of both the item and flag of columns 702 and 704 respectively. The Despatcher code then instructs the thread to jump to a portion of code with the label read from the queue head, i.e. HW1inHandler.

The HW1inHandler code controls the configuration and reading of data into the hardware peripheral. However, it starts by preparing another thread to manage the output of data from the hardware peripheral so that this is ready to go in due course. In other words, DCP(1), the master thread, triggers a slave thread DCP(2) to prepare to transfer data in the other direction. This is done by writing a data item "HW1outHandler" to an example queue Q4, the state of which is shown in column 710. This causes the flag for Q4 in column 712 to be asserted. The slave thread DCP(2) has been executing code shown in column 714 labelled "Slave-Wait" which causes DCP(2) to wait until an item is placed on Q4. DCP(2) detects the flag for Q4, wakes up, and reads the item at the head of Q4 into a variable StartAddrS. The item from Q4 is removed, clearing the queue and the flag. DCP(2) then jumps to the code label read from the queue, "HW1outHandler" as described below.

Meanwhile, returning to DCP(1) in column 708, DCP(1) initiates the configuration of the hardware peripheral HW(1) with the command StartDMAjob(HW1regDMA). This causes the configuration block HW1regDMA 616 to be loaded into the memory access controller 106 and the configuration transferred to the hardware peripheral, as described above with reference to FIG. 6. Thread DCP(1) waits for this to finish, and then initiates the transfer of the data buffer from the memory device 102 to hardware peripheral HW(1) with the command StartDMAjob(HW1inDMA). This causes the configuration block HW1inDMA 620 to be loaded into the memory access controller 106 and the data buffer transferred to the hardware peripheral, as described above with reference to FIG. 6. The data buffer is then processed by the hardware peripheral. Again, the thread waits for this operation to finish, and then waits for notification on Q5 that the slave thread DCP(2) has completed.

Returning again to thread DCP(2) in column 714, the HW1outHandler code is executed in which DCP(2) initiates the transfer of processed data (when ready) from the hardware peripheral HW(1) to the memory device with the command StartDMAjob(HW1outDMA). This causes the configuration block HW1outDMA 624 to be loaded into the memory access controller 106 and the data buffer transferred to the memory device 102, as described above with reference to FIG. 6. Thread DCP(2) waits for this to finish, and then notifies DCP(1) by writing a value "Finished" to Q5. This is shown by the state of Q5 in column 716 and its associated flag being asserted in column 718. Thread DCP(2) then reverts to waiting by branching back to the label "SlaveWait".

As noted above, the master thread DCP(1) has been waiting for the Q5 flag to be asserted, and responsive to this it clears Q5 and its flag. Thread DCP(1) then notifies the next system element that the hardware peripheral operation has been completed by writing the value of the next start address (denoted nextStartAddr) to the next queue that is being used (denoted nextQ). DCP(1) then returns to the Despatcher code, and the process repeats when Q2 is next written to.

The operations described above show how the execution threads can react to and use the information on the queues to manage the configuration and transfer of data to and from the hardware peripherals. The code is compact and rapidly executed, yet sufficiently flexible to enable the digital signal processing system to be configured for different types of data, hardware peripherals and processing requirements. The signalling system gives prioritised sharing of the processor resources, and the processor overhead in dealing with events is very low, whilst still enabling the system elements to react to the most important events.

The term "processor" and "computer" is used herein to refer to any device with processing capability such that it can execute instructions. Those skilled in the art will realize that such processing capabilities are incorporated into many different devices and therefore the term "computer" includes set top boxes, media players, digital radios, PCs, servers, mobile telephones, personal digital assistants and many other devices.

Those skilled in the art will realize that storage devices utilized to store program instructions or data can be distributed across a network. For example, a remote computer may store an example of a process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to "an" item refers to one or more of those items. The term "comprising" is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of the examples.

The invention claimed is:

1. A digital signal processing system, comprising:
a memory device;
a memory access controller providing a plurality of channels for accessing the memory device;
a plurality of fixed function accelerators, each arranged to only perform a predefined specialised signal processing task and not being capable of changing the task performed, each connected to the memory access controller and each configured to read data from the memory device via one of the channels, perform one or more operations on the data, and write data to the memory device via one of the channels; and a multi-threaded processor coupled to the memory access controller and configured to execute a plurality of threads, each thread arranged to control one of the channels, wherein at least one of the threads is configured to detect an occurrence of an event and, responsive thereto, control provision of data from the memory device to a selected fixed function accelerator using the thread's associated channel.

2. A digital signal processing system according to claim 1, wherein the at least one thread executes a wait instruction causing the thread to cease executing further instructions until the event is detected.

3. A digital signal processing system according to claim 1, wherein the event identifies the completion of an operation performed by one of the fixed function accelerators or a digital signal processor.

4. A digital signal processing system according to claim 1, further comprising a plurality of queues arranged to hold one or more items written by the multi-threaded processor responsive to completion of an operation, and notification logic for each queue arranged to assert a flag to indicate when its associated queue contains at least one item.

5. A digital signal processing system according to claim 4, wherein the at least one thread is arranged to detect the occurrence of the event in dependence on assertion of at least one of the flags.

6. A digital signal processing system according to claim 5, wherein the at least one thread is further configured to read an item from a queue associated with an asserted flag, and select and configure the selected fixed function accelerator using the item.

7. A digital signal processing system according to claim 4, wherein the at least one thread is further configured to write an item to one of the queues responsive to at least one of: reading data from the memory device; performing an operation on the data; and writing data to the memory device.

8. A digital signal processing system according to claim 1, wherein at least one further thread from the plurality of threads is configured to detect an occurrence of a further event and, responsive thereto, control provision of data from the selected fixed function accelerator to the memory device a using its associated channel.

9. A digital signal processing system according to claim 1, wherein the multi-threaded processor is configured to allocate a sequential identifier to each thread in a sequence, and give priority to a thread based on its identifier in the case that more than one thread contends for access to the memory device.

10. A method of transferring data in a digital signal processing system, comprising:
executing a plurality of threads on a multi-threaded processor, wherein each thread independently performs a sequence of operations comprising:
waiting until a predefined event is detected; and
responsive to the predefined event, controlling a memory access controller to enable a fixed function accelerator to read data from or write data to a memory device via a memory access channel associated with that thread, wherein the fixed function accelerator is arranged to only perform a predefined specialised signal processing task and is not capable of changing the task performed.

11. A method according to claim 10, wherein the predefined event indicates that a further fixed function accelerator or a digital signal processor has completed an operation on the data in the memory device.

12. A method according to claim 10, wherein the predefined event is detected by monitoring a flag, wherein assertion of the flag indicates occurrence of the predefined event.

13. A method according to claim 12, wherein the sequence of operations further comprises: reading event information from a queue associated with the asserted flag responsive to detecting the predefined event.

14. A method according to claim 13, wherein the sequence of operations further comprises: removing the event information from the queue subsequent to reading the event information.

15. A method according to claim 13, wherein the step of controlling a memory access controller comprises: using the event information to transfer configuration data from the memory device to the memory access controller.

16. A method according to claim 15, wherein the configuration data comprises parameters arranged to cause the memory access controller to perform at least one of:
a transfer of configuration data from the memory device to the fixed function accelerator;
a transfer of a block of data from the memory device to the fixed function accelerator for processing; and
a transfer of a block of processed data from the fixed function accelerator to the memory device.

17. A tangible computer readable medium comprising computer program code to configure a computer to perform a method comprising
executing a plurality of threads on a multi-threaded processor, wherein each thread independently performs a sequence of operations comprising:
waiting until a predefined event is detected; and
responsive to the predefined event, controlling a memory access controller to enable a fixed function accelerator to read data from or write data to a memory device via a memory access channel associated with that thread, wherein the fixed function accelerator is arranged to only perform a predefined specialised signal processing task and is not capable of changing the task performed.

* * * * *